S. R. PAYSON.
PROTECTOR FOR METER CONNECTIONS.
APPLICATION FILED JULY 29, 1916.

1,260,025.

Patented Mar. 19, 1918.
2 SHEETS—SHEET 1.

Inventor
Stephen R. Payson

By Howard E. Barlow
Attorney

Witnesses
J. L. Macdermott
A. T. Macready.

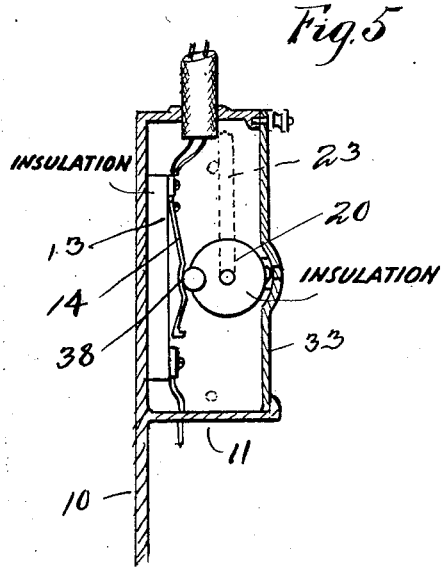
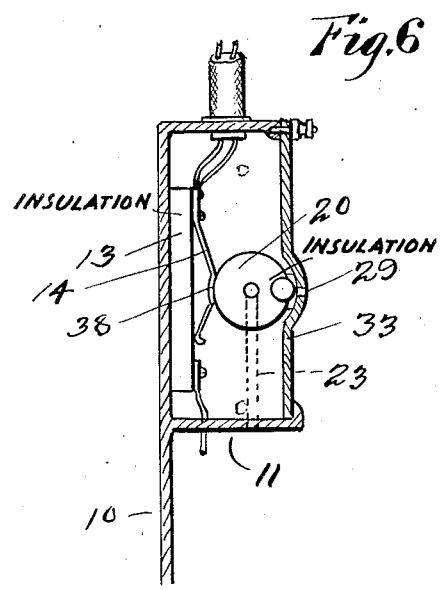
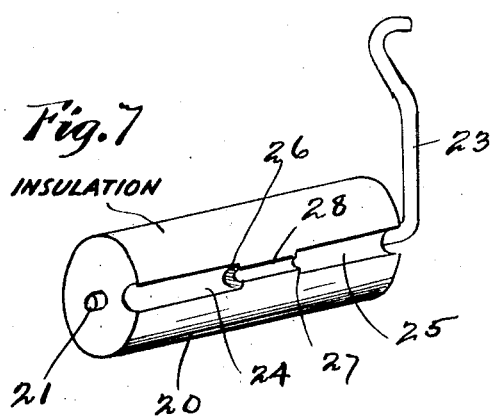
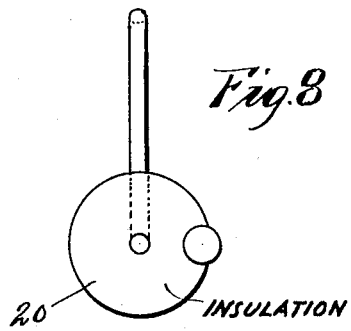
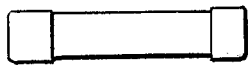

UNITED STATES PATENT OFFICE.

STEPHEN R. PAYSON, OF PROVIDENCE, RHODE ISLAND.

PROTECTOR FOR METER CONNECTIONS.

1,260,025.

Specification of Letters Patent.   Patented Mar. 19, 1918.

Application filed July 29, 1916.   Serial No. 112,082.

*To all whom it may concern:*

Be it known that I, STEPHEN R. PAYSON, a citizen of the United States, and resident of the city of Providence, in the county of Providence and State of Rhode Island, have invented certain new and useful Improvements in Protectors for Meter Connections, of which the following is a specification.

This invention relates to devices for protecting the connections to meters employed to measure electric current and the object of my invention is to provide such a device which is of simple and practical construction and effective in covering and protecting both the service and meter terminals so that current can not be stolen, the casing being closed and sealed against an entrance even when the meter is removed.

A further object of the invention is to provide means in the protecting case whereby a cartridge fuse may be readily moved into position to bridge the service and meter terminals and to be as readily removed to break the circuit when desired, and when in the latter position this fuse may be readily discharged from its carrier and replaced by a fresh one without exposing the terminals.

A further object of the invention is to so locate the terminals in the casing that they may be readily accessible and the whole may be employed as a test block when desired by simply removing the cover of the casing and making the proper connections.

The invention further consists in forming the base of the casing so that the meter and also the terminal casing may be mounted upon it.

With these and other objects in view, the invention consists of certain novel features of construction, as will be more fully described, and particularly pointed out in the appended claims.

Figure 1:
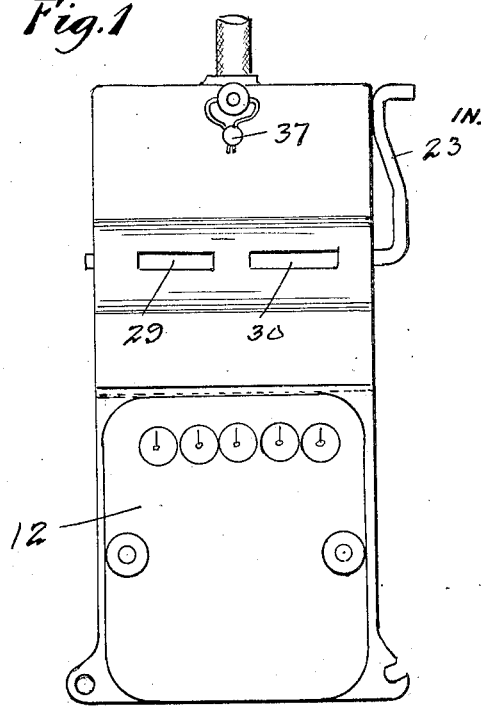

In the accompanying drawings:

Figure 1— is a front view of my improved protector arranged to operate in connection with the electric meter.

Figure 2:
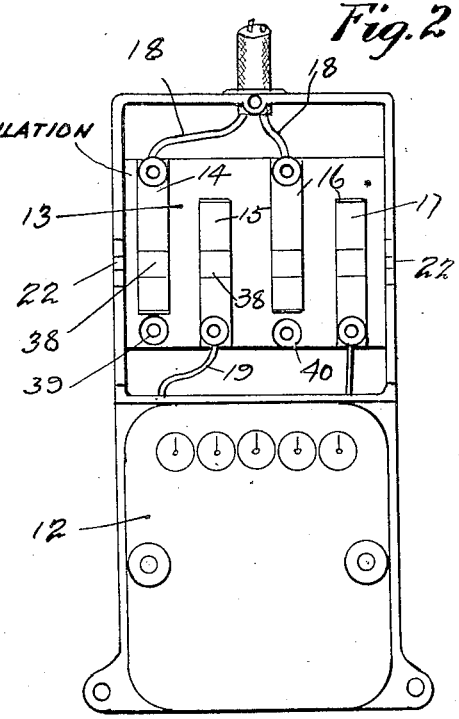

Fig. 2— shows the cover of the terminal casing as removed exposing the terminal contact fingers.

Figure 3:
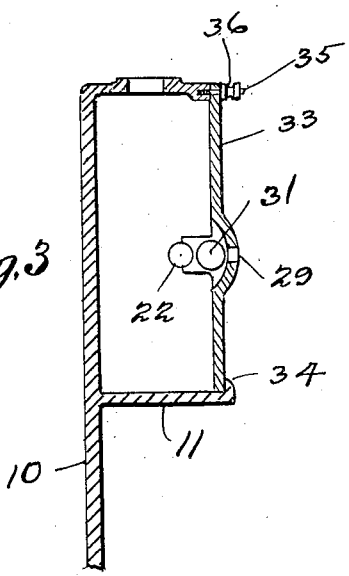

Fig. 3— is a sectional side elevation of the casing which includes the service and meter terminals.

Figure 4:
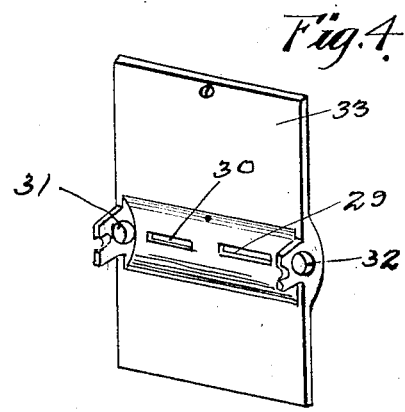

Fig. 4— is a perspective view showing the inner side of the casing cover plate.

Fig. 5— is a sectional side elevation showing the cylindrical fuse carrier as having moved the cartridge fuse to bridge the service and meter terminals.

Fig. 6— shows the cartridge fuse as moved into position to break the circuit between the service and meter terminals and into position to be engaged through the slot in the front plate to be discharged from its carrier for the purpose of inserting a fresh one.

Fig. 7 is a perspective view showing a detail of the cylindrical carrier.

Fig. 8— is an end view of the cylindrical carrier with the cartridge fuse in position therein.

Fig. 9— is a side elevation of an ordinary cartridge fuse.

Referring to the drawings 10 designates a common base plate upon which the protector casing 11 is mounted and upon which the meter 12 may be also mounted if desired, or if desired the meter and protector casing may be made separate and independent and subsequently connected in any suitable way. In this casing 11 is mounted a block 13 of insulating material upon which is mounted spring contact fingers 14 and 15, 16 and 17. Fingers 14 and 16 are connected to the service wires 18 while fingers 15 and 17 are connected by wires 19 to the meter. When it is desired to bridge these fingers 14—15 and 16—17 to permit the current from the service wires to pass through the meter it is customary to provide a fusible link which will melt by an excess flow of current, thereby protecting the meter mechanism against injury and for convenience and safety the usual cartridge type of fuse is preferably employed.

It is found in practice that as these fuses often become blown that it is necessary to provide means whereby they may be readily removed and replaced by fresh ones by the user, and that without gaining access to the interior of the casing and without being obliged to send to the company for an expert. It is very necessary to provide means whereby the opening still remains sealed against access thereto while the cartridge is removed. To accomplish all of these requirements, I have mounted a cylindrical member 20 formed of insulation on the shaft 21 to rotate in bearings 22 in this casing. The rotating means comprising a handle 23 which extends through the exterior of the casing. I have also provided in this cylindrical carrier longitudinal and peripheral grooves 24 and 25 extending into the carrier from opposite ends thereof as best illustrated in Fig. 7, the inner ends of said grooves being provided with abutments or stops 26 and 27 to limit the distance the cartridge shall be passed into the cylinder.

A smaller connecting groove 28 is formed in this abutment portion, whereby a screw driver or other instrument may be passed through the openings 29 and 30 in the front plate to engage the inner end of the cartridge and force it endwise out through its hole 31 or 32 in the cover plate 33 and a fresh one may then be inserted. This cover plate may be secured to the casing in any suitable way but for convenience I have shown a lip 34 under which the lower edge of this plate is hooked and a screw or bolt 35 extends through its upper edge, onto which is threaded a nut 36 which is secured in position by the seal 37, the bolt being soldered or otherwise permanently secured to the casing.

In the operation of my invention the test block 13 is secured in the casing 11, the cylindrical carrier is mounted in its bearings 22, the handle 23 projecting to the outside of the casing. When it is desired to load the carrier with cartridge fuses or other means for bridging the terminal fingers 14—15 and 16—17, the handle 23 is turned down into position illustrated in Fig. 6 and the different cartridges are passed through from opposite sides of the casing into the opposite grooves in the carrier. The handle 23 is then raised into the position illustrated in Fig. 5, which rotates the carrier a half turn and carries the fuses on a circle with a wiping pressure stroke into the lateral grooves 38 in said fingers, which are entered with a snap. The spring pressure of the fingers upon the fuses serves to yieldably retain the carrier in operative position.

When the fuses burn out or it is desired to remove them for any cause, it is only necessary to turn the handle 23 a half revolution into the position illustrated in Fig. 6 which brings the cartridge to the front and in line with the holes 31 and 32 in the side of the casing or cover, whereby an instrument may be readily inserted through the openings 29 and 30 and the cartridges forced quickly out through these openings to be replaced by fresh ones.

It will be noted that by my improved construction and arrangement that the carrier is at all times between the opening in the casing and the terminals, rendering it impossible to surreptitiously or otherwise make connection with these terminals for the purpose of unlawfully using the current.

This terminal block 13 is also provided with terminals 39 and 40 for testing purposes.

It is found in practice that my invention performs a number of functions among others being first, the casing serves to seal the terminals; second, it incloses a block on which the service terminals and a set of testing connections are mounted by which construction this block also serves as a test block for testing the meter; third, the casing serves to seal the service wires and meter connections when the meter is removed for inspection or repairs or for any other purpose; fourth, by my particular means of mounting the cartridge fuse, the fuse itself in addition to these functions is also adapted to serve as a switch for making and breaking the service connections, thereby eliminating the usual switch employed for this purpose.

I have shown and described one illustrative embodiment of my invention but the construction of the same may be varied without departing from the spirit of my invention, the scope of which is defined and limited only by the appended claims.

I claim:

1. A protector for meter connections comprising a casing covering the service and meter terminals, a rotatable carrier contiguous to the terminals and disposed transversely thereof, and a fuse disposed longitudinally of said carrier and mounted in the periphery thereof, said fuse being positioned to be engaged with and disengaged from said terminals by rotation of said carrier, said casing having a discharge opening through which the fuse may be expelled when moved to inoperative position without opening the casing closure.

2. A protector for meter connections comprising a casing covering the service and meter terminals, a rotatable drum contiguous to the terminals and disposed transversely thereof, and a cartridge fuse disposed longitudinally of said drum and carried at the periphery thereof, said fuse being positioned to be engaged with and disengaged from said terminals by rotation of the drum, said casing having a discharge opening positioned to aline with said fuse when the drum has been moved to disengaged position, said casing being also provided with a front opening alined with said discharge opening through which the fuses may be engaged and expelled without opening the casing closure.

3. A protector for meter connections comprising a casing covering the service and meter terminals, a rotatable drum contiguous to the terminals and disposed transversely thereof, said drum having spaced apart alined longitudinal grooves in its periphery, said grooves being connected by a shallower groove, and cartridge fuses carried by the first mentioned grooves, said casing being provided with openings through which the fuses may be engaged and expelled when moved to inoperative position.

In testimony whereof I affix my signature in presence of a witness.

STEPHEN R. PAYSON.

Witness:
HOWARD E. BARLOW.

Copies of this patent may be obtained for five cents each, by addressing the "Commissioner of Patents, Washington, D. C."